July 26, 1955
E. E. KELLY
2,714,042
TRACTION ATTACHMENT FOR VEHICLE WHEELS
Filed Feb. 19, 1952
3 Sheets-Sheet 1
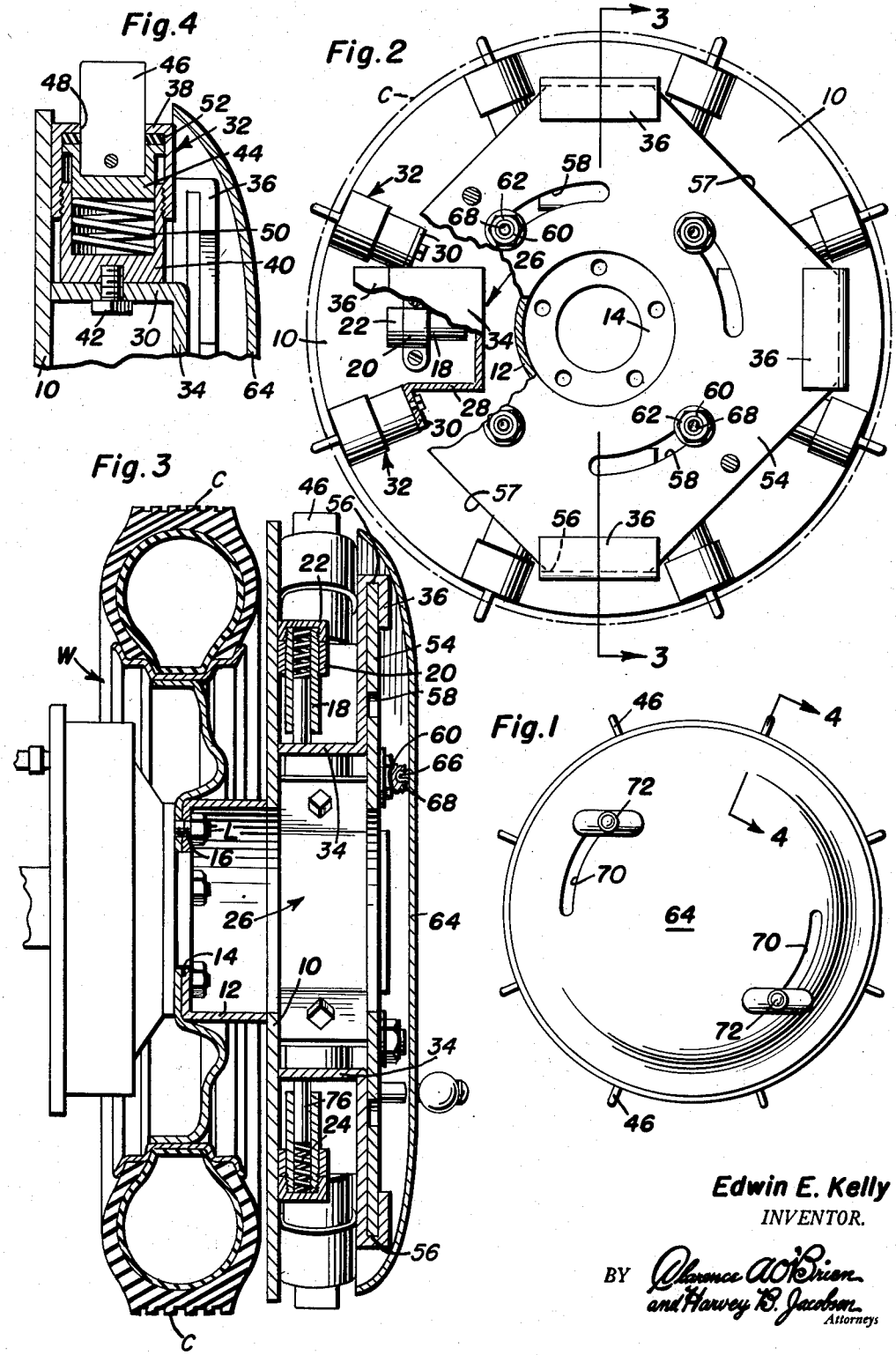
Edwin E. Kelly
INVENTOR.
BY *Clarence A. O'Brien*
and *Harvey B. Jacobson*
Attorneys July 26, 1955     E. E. KELLY     2,714,042
TRACTION ATTACHMENT FOR VEHICLE WHEELS
Filed Feb. 19, 1952     3 Sheets-Sheet 2
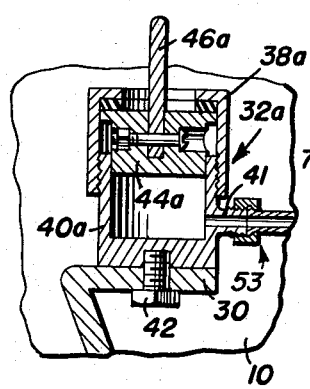
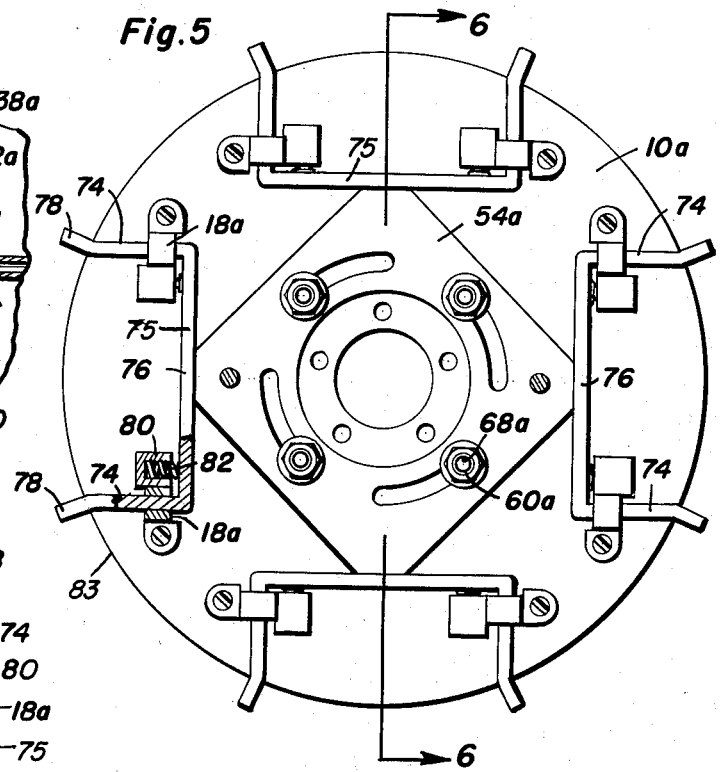
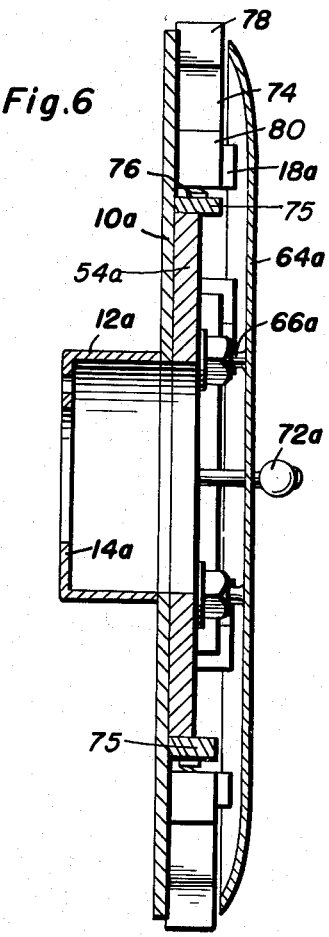
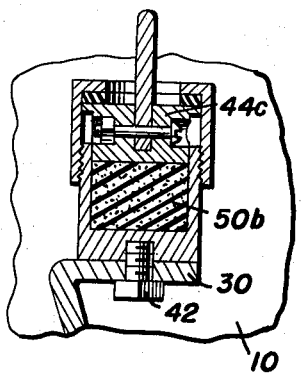
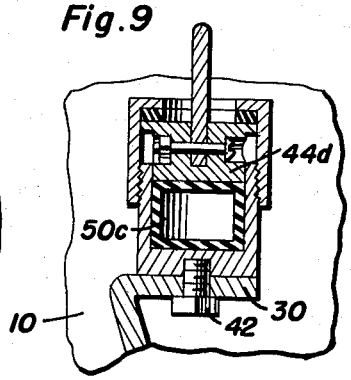
Edwin E. Kelly
INVENTOR.

July 26, 1955  E. E. KELLY  2,714,042
TRACTION ATTACHMENT FOR VEHICLE WHEELS
Filed Feb. 19, 1952  3 Sheets-Sheet 3
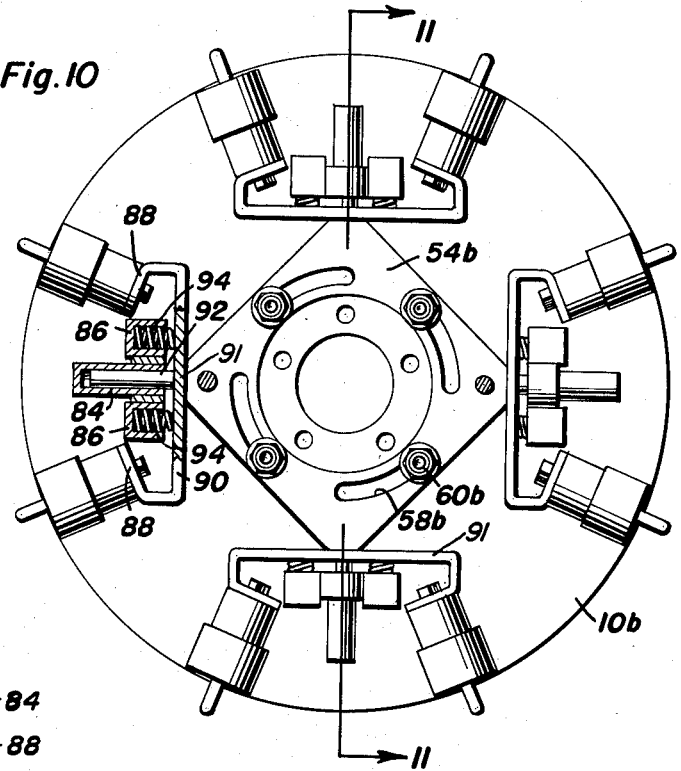
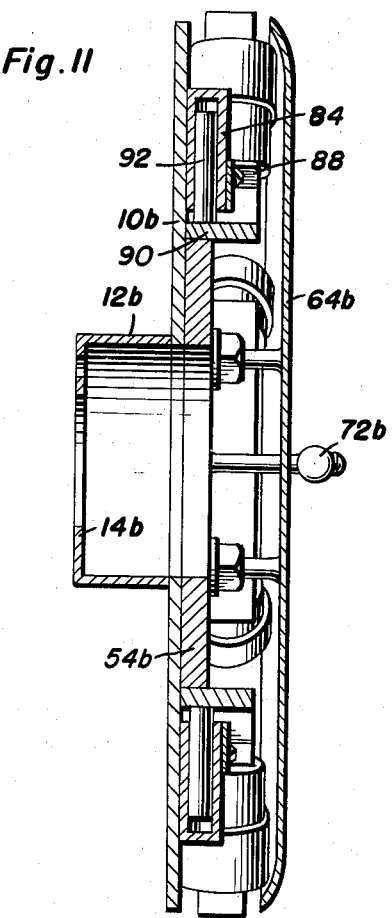
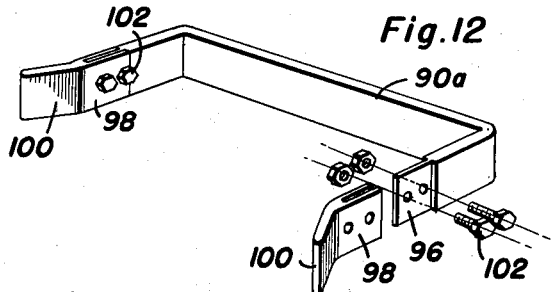
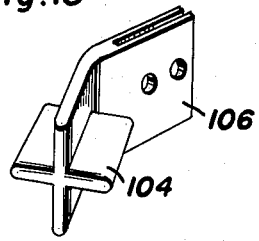
Edwin E. Kelly
INVENTOR.

United States Patent Office 2,714,042
Patented July 26, 1955

2,714,042

TRACTION ATTACHMENT FOR VEHICLE WHEELS

Edwin E. Kelly, Maywood, Ill.

Application February 19, 1952, Serial No. 272,380

11 Claims. (Cl. 301—47)

This invention relates to new and useful improvements in traction devices for vehicle wheels and the primary object of the present invention is to provide an anti-skid attachment for wheels that include a plurality of sliding cleat elements which are movable as a unit to extend radially outwardly beyond the circumference of a wheel.

Another important object of the present invention is to provide a traction attachment for the wheels of passenger cars or trucks and which attachment will be mounted on the wheels by the usual wheel lugs.

Yet another object of the present invention is to provide a traction device for wheels including a manually rotatable cam member that will engage and simultaneously urge a group of cleats to ground engaging position and mounting means for the cam member for locking the cam member against rotation with the cleats extended.

A further object of the present invention is to provide a device of the aforementioned character which embodies replaceable cleat elements that may be conveniently replaced at a minimum cost.

A still further object of the present invention is to provide a traction attachment for vehicle wheels that is simple and practical in construction, strong and reliable in use, small and compact in structure, efficient and durable in use, inexpensive to manufacture, and otherwise well adapted for the purposes for which the same is intended.

Other objects and advantages reside in the details of construction and operation as more fully hereinafter described and claimed, references being had to the accompanying drawings forming part hereof, wherein like numerals refer to like parts throughout, and in which:

Figure 1 is a side elevational view of the present invention;

Figure 2 is an enlarged view of Figure 1 with the cover removed and with parts broken away for the convenience of explanation;

Figure 3 is an enlarged vertical sectional view taken substantially on the plane of section line 3—3 of Figure 2 and showing the device mounted on a wheel;

Figure 4 is an enlarged detail sectional view taken substantially on the plane of section line 4—4 of Figure 1;

Figure 5 is an elevational view of the invention in modified form and with the cover removed and with parts broken away;

Figure 6 is an enlarged vertical sectional view taken substantially on the plane of section line 6—6 of Figure 5;

Figure 7 is a view similar to Figure 4 but showing the cleat element in modified form;

Figure 8 is a view similar to Figures 4 and 7 and showing the cleat element in further modification form;

Figure 9 is a view similar to Figures 4, 7 and 8 but showing the cleat element in still further modified form;

Figure 10 is an elevational view of the traction device in further modified form, with its cover removed and with parts shown in section;

Figure 11 is an enlarged vertical sectional view taken substantially on the plane of section line 11—11 of Figure 10;

Figure 12 is a group perspective view of another type of cleat element used in the invention; and Figure 13 is a perspective view of a "cross" shaped lug element that may be employed with the cleat element of Figure 12, said "cross" shaped configuration of the lug elements may also be employed in the cleat elements of Figures 4, 7, 8 and 9.

Referring now to the drawings in detail, wherein for the purpose of illustration, there is disclosed a preferred embodiment of the present invention, the numeral 10 represents a circular mounting plate or base plate to whose central portion there is fixed an attaching sleeve 12 having an inturned flange 14 that is provided with a plurality of circumferentially spaced apertures 16 for accommodating the lugs L of a vehicle wheel W, whereby the plate 10 will be supported vertically along side the wheel and spaced from the wheel.

A plurality of circumferentially spaced radially disposed guide tubes 18 are secured to the outer face of plate 10 by clamps or brackets 20. The outer ends of the tubes 18 are closed by caps 22 that form abutments for coil springs 24 received in the tubes.

Cleat members indicated generally at 26 are slidably carried by the tubes 18 and the plate 10. The cleat members comprise channels 28 whose outwardly turned ends 30 support generally indicated cleat elements 32. Plates 34 formed with the channels 28 are provided with channel shaped portions 36 which are disposed perpendicular to the tubes 18 which they overlie.

The cleat elements 32, as shown in Figure 4, comprise a pair of threadedly connected cap members 38 and 40, the members 40 being removably secured to the ends 30 by bolts 42. Slides 44 are received in the cap members and support lugs 46 that project through openings 48 in the members 38. Springs 50 in the members 40 engage and urge the slides against washers 52 in the members 38 and the lugs 46 outwardly through the openings 48.

Figure 7 illustrates the cleat element 32a in slightly modified form in that the member 40a is formed with a nipple 41 that is connected to a fluid pressure means 53 for extending the lug 46a carried by slide 44a from the member 38a, rather than the coil spring.

In Figures 8 and 9 the spring 50 of the cleat element shown in Figure 4 is replaced by a rubber block 50b and hollow resilient body 50c, respectively, to comprise urging means for the lug supporting slides 44c and 44d.

Means are provided for engaging and moving the cleat members as a unit and this means comprises a plate cam member 54 having a plurality of corners that are slidably received in the channel shaped portions 36. The corners are provided with straight edges 56 which are to be considered the high portion of the cam that will engage flat against the webs of portions 36 when the members 26 are extended outwardly toward the peripheral edge of plate 10. The cam 54 also includes straight sides 57 which are considered the low portions of the cam and engageable with the webs of portions 36 when the lugs 46 are moved out of an operative position; i. e., when the cam is rotated in a counterclockwise direction.

Cam members 54 are formed with a plurality of arcuate slots 58 that receive guide and holding bolts 60 that are fixed to the outer face of plate 10. The bolts receivably engage nuts 62 that are manually tightened to clamp the cam member against the cleat members and the cleat members against plate 10, to strengthen the device and prevent rattling.

A cover 64 is provided for the base plate and the parts thereon. The cover supports a plurality of spring lugs 66 that are yieldingly held in recesses 68 in the bolts 60. Cover 64 is provided with arcuate slots 70 to permit sliding movement of hand grips 72 that are fixed to the cam member.

When the cam member is manually rotated by the hand grips to move the edges 56 between adjacent cleat members, the springs 24 in tubes 18 will urge plungers 76 fixed to the cleat members radially inwardly to position the lugs 46 radially inwardly of the circumference C of the wheel in a manner similar to that of the previously described embodiment.

Reference is now made to Figures 5 and 6 for an illustration of the invention in modified form. In this embodiment, the base plate 10a again supports an attaching sleeve 12a having an inturned flange 14a. Circumferentially spaced pairs of guide sleeves 18a are secured to the outer face of the plate 10a and slidably receive the leg portions 74 of U-shaped cleat members 76. The ends of the leg portions 74 are bent slightly to form lugs 78.

Tubes 80 are fixed to the sleeves 18a, in any suitable manner, and house coil springs 82 that engage the web portions 75 of the cleat members 76 to yieldingly urge the lugs 78 radially inwardly of the peripheral edge 83 of the base plate 10a.

A cam member 54a is rotatably mounted on the base plate, like the plate 10, and its straight corner edges or high cam portions 56 will ride against the web portions 75 of the cleat members 76 to extend the lugs 78 outwardly from the circumference of the wheel in a manner similar to that of the previously described embodiments.

Base plate 10a is provided with a cover 64a carrying resilient lugs 66a that are yieldingly retained in recesses 68a in the mounting bolts 60a of the cam member. Hand grips 72a are fixed to the cam member and are slidably received in arcuate slots in the cover.

Attention is next directed to Figures 10 and 11 wherein there is disclosed a further form of the invention. The base plate 10b supports at its center an attaching sleeve 12b having an inturned flange 14b. Circumferentially spaced radially disposed guide tubes 84 are removably secured to the plate 10b, in any suitable manner, along with spring holding sockets 86.

The inturned ends 88 of U-shaped cleat members 90 removably hold cleat elements of the type shown in Figures 4, 7, 8 or 9. The web portions of the cleat members 90 guide pins 92 that are slidably received in the tubes 84. Springs 94 in the sockets 86 engage the web portions 91 of the members 90 to urge the lugs of the cleat members radially inwardly of the peripheral edge of the plate 10b when the cam is rotated in a counter-clockwise direction.

A rotatable cam member 54b is secured to the base plate by bolts 60b received in slots 58b in the cam member. A cover 64b is releasably secured to the bolts 60b and is provided with arcuate slots receiving the hand grips 72b for the cam member.

Figure 12 is a perspective view of a U-shaped cleat member 90a that may be employed in the invention. The ends of the member 90a are reduced to form attaching tongues 96 that are removably secured to the bifurcated ends 98 of angulated lugs 100 by fasteners 102.

Substantially "cross" shaped lugs 104 may replace the lugs 100 and the lugs 104 are provided with bifurcated shanks 106 for attachment to the tongues 96.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention what is claimed as new is:

1. A traction attachment for a vehicle wheel comprising a base plate having a peripheral edge, said plate being attachable to a vehicle wheel, a plurality of circumferentially spaced cleat holding members slidably carried by the plate, each of said members having a channel shaped portion, a cam member rotatably supported on the plate slidably engaging the channel shaped portions for sliding the cleat holding members outwardly toward the peripheral edge of the plate, and a pair of cleat elements supported by each of the members.

2. The combination of claim 1 wherein said cleat elements include sliding lugs carried by the members, and cushioning means for the lugs restricting inward movement of the lugs relative to the peripheral edge of said plate.

3. A traction attachment for a vehicle wheel comprising a base plate having a peripheral edge, said plate being attachable to a vehicle wheel, a plurality of circumferentially spaced cleat holding members slidably carried by the plate, each of said members having a channel shaped portion, a cam member rotatably supported on the plate slidably engaging the channel shaped portions for sliding the members outwardly toward the peripheral edge of the plate, spring means engaging and urging the members inwardly from the peripheral edge of said plate, and spring pressed cleat elements carried by the members.

4. The combination of claim 3 wherein each of said cleat elements includes a pair of threadedly connected cap members one of which is provided with an opening, a slide in each of the cap members and a lug attached to the slide and received in the opening.

5. An anti-skid attachment for a vehicle wheel comprising a mounting plate, said plate being attachable to a vehicle wheel, a plurality of cleats slidably carried by the base and movable outwardly from the peripheral edge of the plate, means yieldingly urging the cleats inwardly of the peripheral edge of the plate, and a cam member rotatably mounted on the plate for simultaneously engaging and moving the cleats outwardly of the peripheral edge of the plate, said cleat members each comprising a U-shaped holding portion, and lugs detachably secured to the legs of the holding portions.

6. A traction attachment for a vehicle wheel comprising a base plate having a peripheral edge, said plate being attachable to a vehicle wheel, a plurality of circumferentially spaced cleat holding members slidably carried by the plate, each of said members having a channel shaped portion, a cam member rotatably supported on the plate slidably engaging the channel shaped portions for sliding the members outwardly toward the peripheral edge of the plate, spring means engaging and yieldingly urging the members inwardly of the peripheral edge of the plate, sliding lugs carried by the members, and means urging the lugs outwardly from the peripheral edge of said plate.

7. The combination of claim 6 wherein said lug urging means comprises a spring.

8. The combination of claim 6 wherein said lug urging means comprises rubber block.

9. The combination of claim 6 wherein said lug urging means comprises a hollow resilient body.

10. The combination of claim 6 wherein said lug urging means comprises a fluid pressure means.

11. The combination of claim 5 wherein said lugs each comprises a pair of cross shaped rigid elements.

References Cited in the file of this patent

UNITED STATES PATENTS

| | | |
|---|---|---|
| 1,193,855 | Wright | Aug. 8, 1916 |
| 1,435,863 | Lantz | Nov. 14, 1922 |
| 1,813,391 | Ellsworth | July 7, 1931 |
| 1,830,534 | Erwin | Nov. 3, 1931 |
| 2,241,849 | Fuchs | May 13, 1941 |
| 2,559,721 | Kruse | July 10, 1951 |